(12) United States Patent
Nakano et al.

(10) Patent No.: US 7,541,777 B2
(45) Date of Patent: Jun. 2, 2009

(54) BATTERY PROTECTION CIRCUIT

(75) Inventors: Itsuki Nakano, Atsugi (JP); Kazuhiro Ooshita, Atsugi (JP); Daisuke Kimura, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 431 days.

(21) Appl. No.: 11/343,735

(22) Filed: Jan. 30, 2006

(65) Prior Publication Data
US 2006/0267557 A1 Nov. 30, 2006

(30) Foreign Application Priority Data
May 31, 2005 (JP) .............................. 2005-160140

(51) Int. Cl.
*H02J 7/00* (2006.01)
(52) U.S. Cl. ...................... 320/134; 320/136
(58) Field of Classification Search .................. 361/57, 361/58, 59, 75, 98; 320/134, 136
See application file for complete search history.

(56) References Cited

U.S. PATENT DOCUMENTS
2005/0242779 A1* 11/2005 Yoshio ...................... 320/134

FOREIGN PATENT DOCUMENTS
JP 6-303728 10/1994

* cited by examiner

*Primary Examiner*—Akm E Ullah
*Assistant Examiner*—Jue Zhang
(74) *Attorney, Agent, or Firm*—Ladas & Parry LLP

(57) ABSTRACT

A battery protection circuit includes an abnormal condition detection circuit having a resistor through which a current flows from a load in response to a current flowing in the load. The resistor generates a voltage in response to the current flowing in the load. The battery protection circuit further includes a control circuit having a detection stop switch configured to control the current flowing in the resistor from the load. The control circuit turns off the detection stop switch and a protection switch connected between the battery and the load when the abnormal condition detection circuit detects the abnormal condition according to the voltage generated by the resistor. The control circuit returns the detection stop switch to an ON state after returning the protection switch to an ON state in response to a start of supplying power from the battery to the battery protection circuit.

5 Claims, 2 Drawing Sheets

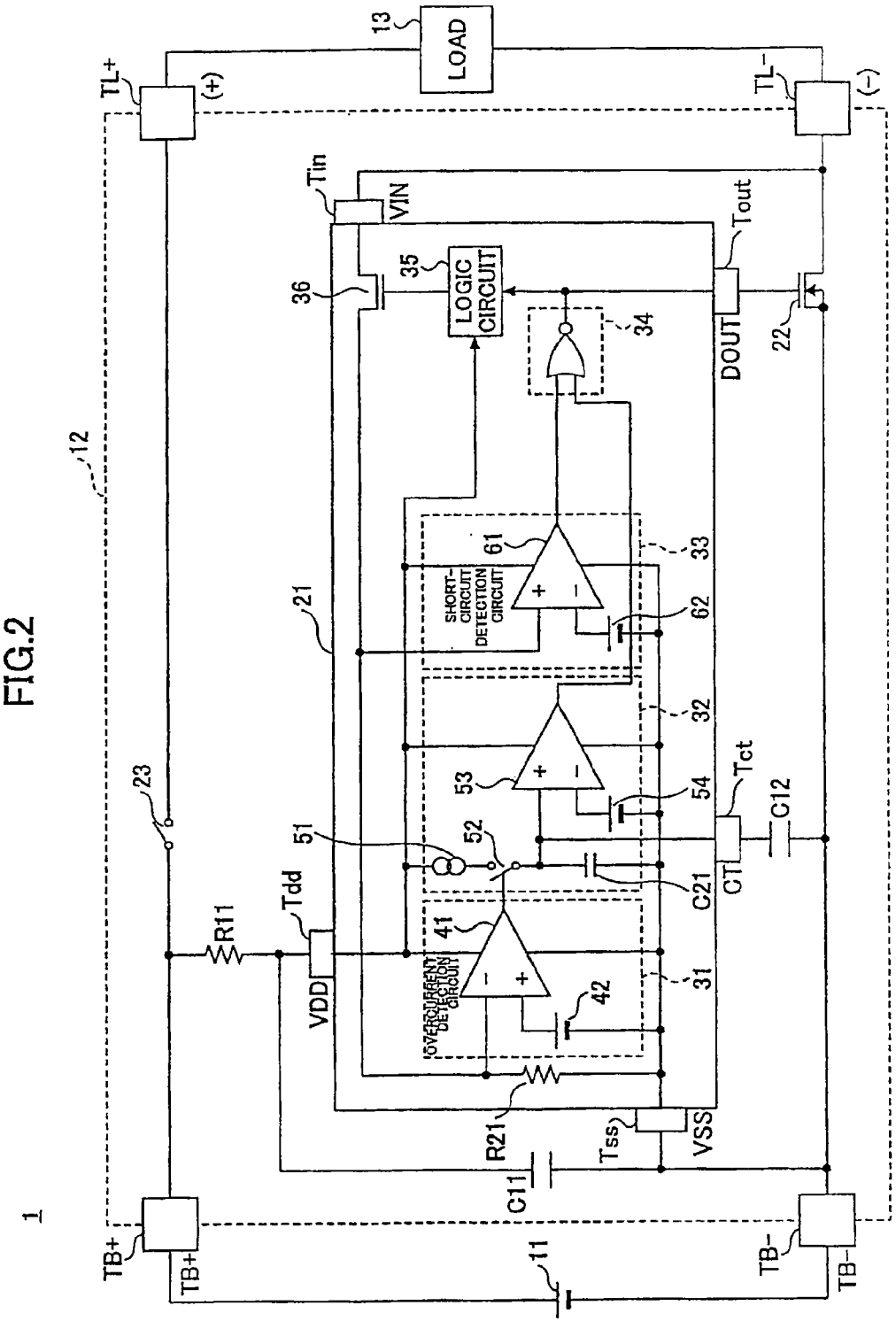

BATTERY PROTECTION CIRCUIT

BACKGROUND OF THE INVENTION

1. Field of the Invention

The present invention generally relates to a battery protection circuit, and especially to a battery protection circuit that detects an abnormal condition of the battery and turns off a switch connected between the battery and a load.

2. Description of the Related Art

Japanese Patent Application Publication No. 6-303728 discloses a protection circuit that detects current supplied from a battery to a load and disconnects the load from the battery so as to protect the battery when an overcurrent condition is detected.

FIG. 2 is a block diagram illustrating an example of a conventional battery protection system 1.

The conventional battery protection system 1 comprises a battery 11, a battery protection unit 12, and a load 13.

The battery 11 includes a primary battery such as a manganese dioxide battery, an alkaline battery and the like or a secondary (rechargeable) battery such as a nickel-cadmium battery, a lithium ion battery and the like. A positive electrode of the battery 11 is connected to a terminal TB+ of the battery protection unit 12. On the other hand, a negative electrode of the battery 11 is connected to a terminal TB− of the battery protection unit 12.

The battery protection unit 12 comprises a battery protection circuit 21, a switch 22, a reset switch 23, a resistor R11, and capacitors C11 and C12. The battery protection unit 12 detects abnormal conditions such as an overcurrent condition and a short circuit condition in response to a voltage of a terminal TL−. When the abnormal conditions are detected, the switch 22 is turned off so as to protect the battery 11 from the overcurrent condition or the short circuit condition.

The terminal TB+ is connected to the terminal TL+ through the reset switch 23. In addition, the terminal TB+ is connected to the terminal TB− through the resistor R11 and the capacitor C11. Moreover, the terminal TB− is connected to the terminal TL− through the switch 22.

The battery protection circuit 21 includes terminals, Tdd, Tss, Tin, Tout and Tct. The terminal Tdd is connected to a junction point between the resistor R11 and the capacitor C11. Accordingly, a voltage decreased by the resistor R11 and smoothed by the capacitor C11 is applied to the battery protection circuit 21 as a driving voltage VDD.

The terminal Tss is connected to the terminal TB−. The terminal Tin is connected to the terminal TL−. The terminal Tout is connected to a gate of a transistor comprising the switch 22. The terminal Tct is connected to the terminal TB− through the capacitor C12.

The battery protection circuit 21 further includes a resistor R21 for detection, an overcurrent detection circuit 31, a delay circuit 32, a short-circuit detection circuit 33, an output circuit 34, a logic circuit 35, and a switch 36.

As for the resistor R21 for detection, one end thereof is connected to the terminal Tin through the switch 36. While the switch 36 is turned on, the resistor R21 generates a voltage in response to a current flowing from the terminal Tin. The voltage generated by the resistor R21 is supplied to the overcurrent detection circuit 31 and the short-circuit detection circuit 33.

The overcurrent detection circuit 31 comprises a comparator 41 and a reference voltage source 42. The voltage generated by the resistor R21 is supplied to an inverting input terminal of the comparator 41. On the other hand, the first reference voltage from the reference voltage source 42 is applied to a non-inverting input terminal of the comparator 41.

When the voltage of the resistor R21 is greater than the first reference voltage from the reference voltage source 42, the comparator 41 determines that the circuit is in the overcurrent condition and sets the output level to low. On the contrary, when the voltage of the resistor R21 is smaller than the first reference voltage from the reference voltage source 42, the comparator 41 determines that the circuit is in the normal condition and sets the output level to high. The output of the comparator 41 is supplied to the delay circuit 32.

The delay circuit 32 comprises a constant current source 51, a switch 52, a comparator 53, a reference voltage source 54 and a capacitor C21.

The constant current source 51 supplies a constant current to one end of the switch 52. The other end of the switch 52 is connected to the capacitor C21. When the output level of the overcurrent detection circuit 31, i.e., the output level of the comparator 41 is set to low, the switch 52 is turned on. On the contrary, when the output level of the comparator 41 is set to high, the switch 52 is turned off. One end of the capacitor C21 is connected to both a non-inverting input terminal of the comparator 53 and the terminal Tct. The terminal Tct is connected to the terminal TB− through the capacitor C12.

When the switch 52 is turned on, the capacitors C12 and C21 are charged. The charging voltage of the capacitors C12 and C21 is applied to the non-inverting input terminal of the comparator 53. On the other hand, to an inverting input terminal of the comparator 53, the second reference voltage from the reference voltage source 54 is applied.

As the overcurrent condition continues, the charging voltage of the capacitors C12 and C21 becomes greater than the second reference voltage from the reference voltage source 54. Then, the comparator 53 sets the output level to high. The output of the comparator 53 is supplied to the output circuit 34.

The short-circuit detection circuit 33 comprises a comparator 61 and a reference voltage source 62. The voltage generated by the resistor R21 is applied to a non-inverting input terminal of the comparator 61. On the other hand, to an inverting input terminal of the comparator 61, the third reference voltage from the reference voltage source 62 is applied. When a short occurs between the terminals TL+ and TL−, the voltage of the terminal Tin becomes greater than the third reference voltage from the reference voltage source 62. Then, the comparator 61 sets the output level to high. The output of the comparator 61 is supplied to the output circuit 34.

The output circuit 34 comprises a NOR circuit. The NOR circuit outputs a NOR operation result obtained from the output of the delay circuit 32 and the output of the short-circuit detection circuit 33. The output circuit 34 sets the output level to low when the output level of the delay circuit 32 becomes high owing to the continuous overcurrent condition or when the output level of the short-circuit detection circuit 33 becomes high owing to the short-circuit between the terminals TL+ and TL−. To the contrary, the output circuit 34 sets the output level to high when the output level of the delay circuit 32 is low that indicates non-overcurrent condition and when the output level of the short-circuit detection circuit 33 is low that indicates non-short-circuit condition since the short does not occur between the terminals TL+ and TL−.

The output of the output circuit 34 is supplied to the terminal Tout. The output of the terminal Tout is supplied to a gate of an N-channel MOSFET (Metal-Oxide-Semiconductor Field-Effect Transistor) comprising the switch 22. The switch 22 is turned on when the output level of the output circuit 34 is high in which neither the overcurrent condition nor the short-circuit condition are detected. When the switch 22 is turned on, current is supplied from the battery 11 to the load 13.

Moreover, the switch 22 is turned off when the output level of the output circuit 34 is low in which the overcurrent condition or the short-circuit condition is detected. When the switch 22 is turned off, the terminal TB– is disconnected from the terminal TL– so that the current is prevented from being supplied from the battery 11 to the load 13. Accordingly, the battery 11 and the load 13 are protected from the overcurrent and short-circuit conditions.

The logic circuit 35 connected to the terminals Tdd and Tout switches the switch 36 in response to the output voltages of the terminals Tdd and Tout. The logic circuit 35 turns off the switch 36 when the output voltage of the terminal Tout becomes low because of the overcurrent condition or the short circuit condition. On the other hand, the logic circuit 35 turns on the switch 36 when a driving voltage VDD applied to the terminal Tdd becomes greater than a predetermined voltage. Thus, the overcurrent condition and the short-circuit condition can be detected again.

According to Japanese Laid-Open Patent Application Publication No. 6-303728, in the battery protection system 1, when the switch 22 is turned off for the emergency protection, the reset switch 23 is turned off so as to return the switch 22 to the ON state. One end of the reset switch 23 is connected to a junction point (node) between the terminal TB+ and an end of the resistor R11. The other end of the reset switch 23 is connected to the terminal TL+. When the reset switch 23 is turned off, the load 13 is disconnected from the battery protection circuit 21. Accordingly, the current does not flow through the terminal Tin; and thus, the overcurrent and short-circuit conditions are eliminated. Therefore, the switch 22 is turned on.

In the conventional battery protection circuit, once the switch 22 is turned off owing to the abnormal condition, unless the battery 11 is once released and reconnected while the load 13 is disconnected, the switch 22 remains in the OFF state. Thus, it is impossible to return to a normal driving condition. Accordingly, the reset switch 23 is indispensable. Therefore, there is a problem in which flexibility of design is restricted.

SUMMARY OF THE INVENTION

It is a general object of the present invention to provide a battery protection circuit that substantially obviates one or more problems caused by the limitations and disadvantages of the related art.

It is another and more specific object of the present invention to provide a battery protection circuit that can return the circuit from a battery protecting condition to a normal driving condition by only releasing and reconnecting the battery.

To achieve these and other advantages in accordance with the purpose of the invention, an embodiment of the invention provides a battery protection circuit that includes an abnormal condition detection circuit having a current detection resistor through which a current flows from a load in response to a current flowing in the load. The resistor generates a voltage in response to the current flowing in the load. The abnormal condition detection circuit is able to detect an abnormal condition of a battery according to the voltage generated by the resistor. The battery protection circuit further includes a control circuit having a detection stop switch configured to control the current flowing in the resistor from the load. The control circuit is able to turn off the detection stop switch and a protection switch connected between the battery and the load when the abnormal condition detection circuit detects the abnormal condition. The control circuit returns the detection stop switch to an ON state after returning the protection switch to an ON state in response to a start of supply of power from the battery to the battery protection circuit.

According to at least one embodiment of the present invention, the control circuit includes a power-on-reset circuit able to output a reset signal when the voltage of the battery is applied to the battery protection circuit, and a latch circuit able to reset an output thereof in response to the reset signal output from the power-on-reset circuit. The control circuit returns the protection switch to the ON state by the output of the latch circuit being reset.

According to at least one embodiment of the present invention, the abnormal condition detection circuit further includes an overcurrent detection circuit able to compare the voltage generated by the resistor with the first reference voltage and output an overcurrent signal when the voltage generated by the resistor is greater than the first reference voltage, and a delay circuit including a capacitor. The delay circuit is able to charge the capacitor when the overcurrent signal is supplied from the overcurrent detection circuit and output an abnormal signal when a charging voltage of the capacitor is greater than the second reference voltage. The abnormal condition detection circuit further includes a short-circuit detection circuit able to compare the voltage generated by the resistor with the third reference voltage and output an abnormal signal when the voltage generated by the resistor is greater than the third reference voltage. The control circuit further includes an output circuit able to turn off the protection switch when the abnormal signal is supplied from one of the delay circuit and the short-circuit detection circuit, and a logic circuit able to turn off the detection stop switch after the protection switch is turned off by an output of the output circuit.

According to at least one embodiment of the present invention, the logic circuit monitoring the voltage of the battery returns the detection stop switch to the ON state in response to a start of supplying the voltage of the battery to the battery protection circuit.

According to at least one embodiment of the present invention, the battery protection circuit further includes a reset switch configured to control a voltage supplied from the battery to the control circuit.

According to the present invention, the protection switch is returned to the ON state in response to the start of supplying the voltage from the battery to the control circuit. Thus, it is possible to return the protection switch to the ON state by just releasing and reconnecting the battery. Therefore, flexibility of design can be improved.

BRIEF DESCRIPTION OF THE DRAWINGS

Other objects and further features of the present invention will become apparent from the following detailed description when read in conjunction with the accompanying drawings, in which:

FIG. 2 is a block diagram illustrating an example of a conventional battery protection system.

DESCRIPTION OF THE PREFERRED EMBODIMENTS

Figure 1:
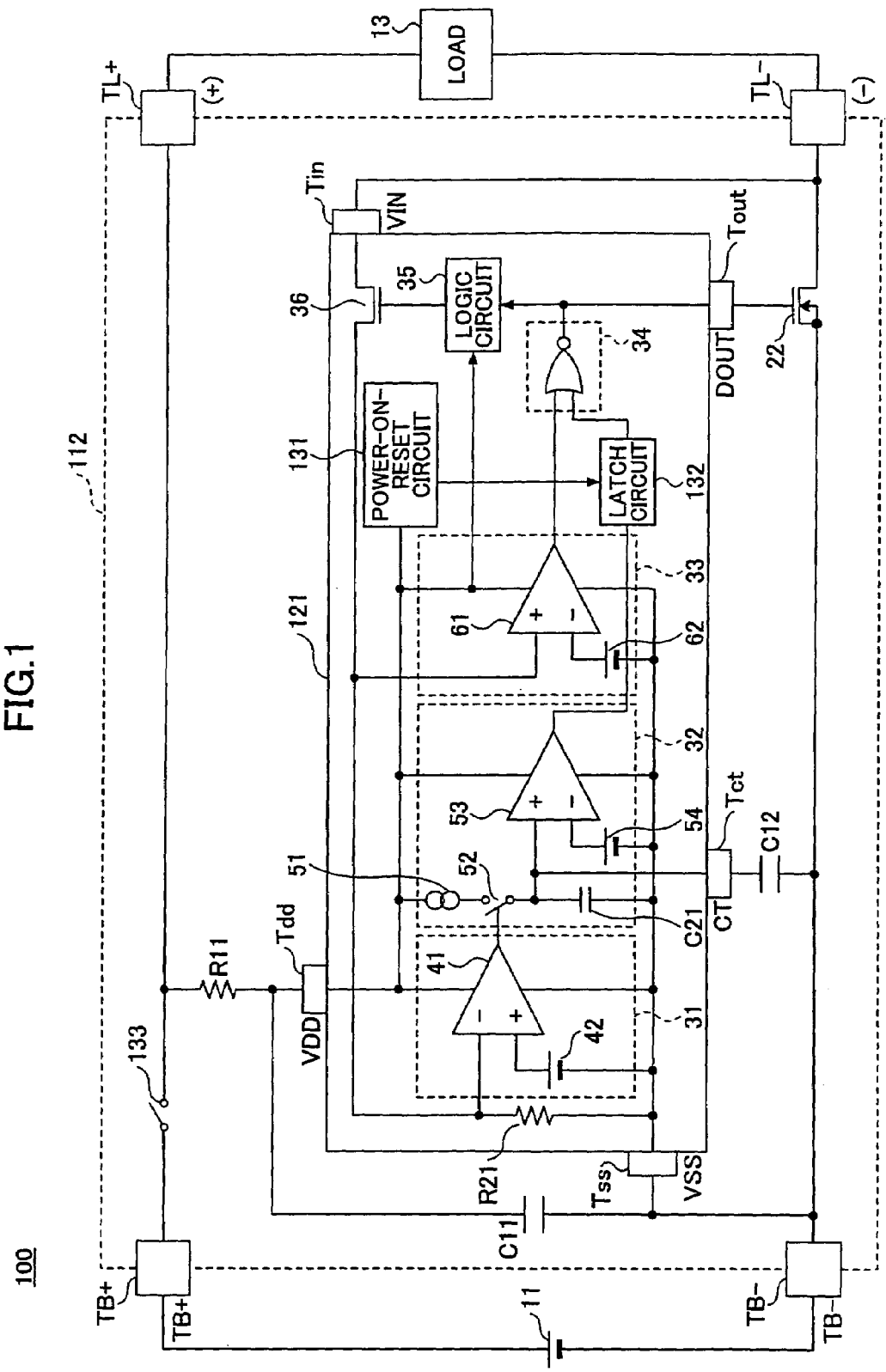
FIG. 1 is a block diagram illustrating an example of a battery protection system according to an embodiment of the present invention.

In the following, embodiments of the present invention are described with reference to the accompanying drawings.

FIG. 1 is a block diagram illustrating an example of a battery protection system according to an embodiment of the present invention. In FIG. 1, the same components as shown in FIG. 2 are given the same reference numerals, in which descriptions thereof are omitted.

A battery protection system 100 according to the present embodiment differs from the battery protection system 1 shown in FIG. 2 in the configuration of a battery protection circuit 121 comprising a battery protection unit 112.

The battery protection circuit 121 according to the present embodiment comprises, for example, an IC. The battery protection circuit 121 is configured so that a power-on-reset circuit 131 and a latch circuit 132 are added to the battery protection circuit 21 shown in FIG. 2.

The power-on-reset circuit 131 monitors the driving voltage VDD applied to the terminal Tdd and outputs a reset signal when the driving voltage VDD becomes greater than the predetermined voltage. The reset signal output from the power-on-reset circuit 131 is supplied to the latch circuit 132.

The latch circuit 132 is connected between an output terminal of the delay circuit 32 and an input terminal of the output circuit 34. Regardless of the output of the delay circuit 32, an output level of the latch circuit 132 is reset to low in response to the reset signal output from the power-on-reset circuit 131. The output of the latch circuit 132 is supplied to the output circuit 34. At this moment, the switch 36 remains in the OFF state. The output level of the short-circuit detection circuit 33 is set to low.

Since the output level of the short-circuit detection circuit 33 and the output level of the latch circuit 132 are set to low, the output level of the output circuit 34 is set to high. As the output level of the output circuit 34 is set to high, the switch 22 is turned on. As the switch 22 is turned on, it is possible to supply power from the battery 11 to the load 13.

After the switch 22 is turned on, the logic circuit 35 turns on the switch 36 later. This can be performed, for example, if a threshold value of the power-on-reset circuit 131 is set smaller than the threshold value of the logic circuit 35. Accordingly, it is possible to return the switch 22 to the ON state by disconnecting and reconnecting the driving voltage VDD applied to the terminal Tdd.

According to the present embodiment, the switch 22 can be returned to the ON state by only switching on and off the reset switch 133 where one end thereof is connected to the terminal TB+ and the other end thereof is connected to the junction point (node) between the resistor R11 and the terminal TL+.

MODIFIED EXAMPLE

In the embodiment above, each of the battery protection circuit 121 and the switch 22 is formed as a different component. However, the battery protection circuit 121 and the switch 22 can be mounted on the same semiconductor chip.

APPLICATION EXAMPLE

The battery protection unit 112 according to the present embodiment is able to detect an overdischarge of the secondary (rechargeable) battery.

Further, the battery protection unit 112 may be mounted on a battery box so as to be configured as a set. In this case, the battery protection unit 112 may be formed as a COB module.

It should be noted that the load 13 may be a DC motor, a light bulb, a silicon audio system utilizing a memory, and the like.

Moreover, the present invention can be applied as a substitute for a fuse of devices such as a circuit breaker and an ammeter in which an overcurrent is likely to flow.

Further, the present invention is not limited to these embodiments, but variations and modifications may be made without departing from the scope of the present invention.

The present application is based on Japanese Priority Application No. 2005-160140 filed on May 31, 2005, with the Japanese Patent Office, the entire contents of which are hereby incorporated by reference.

What is claimed is:

1. A battery protection circuit comprising:
   an abnormal condition detection circuit including a current detection resistor through which a current flows from a load in response to a current flowing in the load, said resistor generating a voltage in response to the current flowing in the load, said abnormal condition detection circuit being able to detect an abnormal condition of a battery according to the voltage generated by the resistor; and
   a control circuit including a detection stop switch configured to control the current flowing in the resistor from the load, said control circuit being able to turn off the detection stop switch and a protection switch connected between the battery and the load when the abnormal condition detection circuit detects the abnormal condition, wherein the protection switch and the detection stop switch are connected in parallel between the battery and the load; wherein
   said control circuit includes a logic circuit configured to turn off the detection stop switch after the protection switch is turned off and to return the detection stop switch to an ON state after returning the protection switch to an ON state in response to a start of supplying power from the battery to the battery protection circuit.

2. The battery protection circuit as claimed in claim 1, wherein said control circuit includes a power-on-reset circuit able to output a reset signal in response to the start of supplying power from the battery to the battery protection circuit, and a latch circuit able to reset an output thereof in response to the reset signal output from the power-on-reset circuit, said control circuit returning the protection switch to the ON state by the output of the latch circuit being reset.

3. A battery protection circuit comprising:
   an abnormal condition detection circuit including a current detection resistor through which a current flows from a load in response to a current flowing in the load, said resistor generating a voltage in response to the current flowing in the load, said abnormal condition detection circuit being able to detect an abnormal condition of a battery according to the voltage generated by the resistor; and
   a control circuit including a detection stop switch configured to control the current flowing in the resistor from the load, said control circuit being able to turn off the detection stop switch and a protection switch connected between the battery and the load when the abnormal condition detection circuit detects the abnormal condition; wherein
   said control circuit returns the detection stop switch to an ON state after returning the protection switch to an ON state in response to a start of supplying power from the battery to the battery protection circuit, wherein the abnormal condition detection circuit further includes:

an overcurrent detection circuit able to compare the voltage generated by the resistor with a first reference voltage and output an overcurrent signal when the voltage generated by the resistor is greater than the first reference voltage;

a delay circuit including a capacitor, said delay circuit being able to charge the capacitor when the overcurrent signal is supplied from the overcurrent detection circuit and output an abnormal signal when a charging voltage of the capacitor is greater than a second reference voltage; and a short-circuit detection circuit able to compare the voltage generated by the resistor with a third reference voltage and output an abnormal signal when the voltage generated by the resistor is greater than the third reference voltage;

and wherein said control circuit further includes:

an output circuit able to turn off the protection switch when the abnormal signal is supplied from one of the delay circuit and the short-circuit detection circuit; and a logic circuit able to turn off the detection stop switch after the protection switch is turned off by an output of the output circuit.

4. The battery protection circuit as claimed in claim 3, wherein the logic circuit monitoring a voltage of the battery returns the detection stop switch to the ON state in response to a start of supplying the voltage of the battery to the battery protection circuit.

5. The battery protection circuit as claimed in claim 1, further comprising a reset switch configured to control a voltage supplied from the battery to the control circuit.

* * * * *